US011440424B2

United States Patent
Yu et al.

(10) Patent No.: US 11,440,424 B2
(45) Date of Patent: Sep. 13, 2022

(54) HANDS FREE CHARGING SYSTEM WITH POWER LOSS DETECTION AND MANAGEMENT

(71) Applicant: FORD GLOBAL TECHNOLOGIES, LLC, Dearborn, MI (US)

(72) Inventors: Lan Yu, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/016,800

(22) Filed: Sep. 10, 2020

(65) Prior Publication Data
US 2022/0072972 A1 Mar. 10, 2022

(51) Int. Cl.
| | | |
|---|---|---|
| *B60L 53/00* | (2019.01) | |
| *B60L 53/35* | (2019.01) | |
| *H02J 7/00* | (2006.01) | |
| *B60L 53/18* | (2019.01) | |
| *B60L 53/50* | (2019.01) | |

(Continued)

(52) U.S. Cl.
CPC ............... *B60L 53/35* (2019.02); *B60L 53/18* (2019.02); *B60L 53/50* (2019.02); *B60L 53/53* (2019.02); *B60L 53/55* (2019.02); *B60L 53/60* (2019.02); *H01M 10/448* (2013.01); *H02J 7/0029* (2013.01); *H02J 7/0045* (2013.01); *H02J 7/0047* (2013.01); *H02J 7/02* (2013.01); *H02J 7/345* (2013.01); *H01M 2220/20* (2013.01); *H02J 2207/50* (2020.01)

(58) Field of Classification Search
CPC .......... B60L 53/35; B60L 53/18; B60L 53/50; B60L 53/60; B60L 53/53; B60L 53/55; H02J 7/0029; H02J 7/0045; H02J 7/0047; H02J 7/02; H02J 7/345; H02J 2207/50; H01M 10/448; H01M 2220/20
See application file for complete search history.

(56) References Cited

U.S. PATENT DOCUMENTS

| | | | | | |
|---|---|---|---|---|---|
| 3,999,372 | A | * | 12/1976 | Welch | G07F 17/246 368/6 |
| 5,306,999 | A | * | 4/1994 | Hoffman | B60L 53/31 320/109 |

(Continued)

FOREIGN PATENT DOCUMENTS

| | | | | | |
|---|---|---|---|---|---|
| AT | | 511533 A1 | * | 12/2012 | |
| CN | | 102456989 B | * | 12/2014 | ............... B60L 53/16 |

(Continued)

*Primary Examiner* — Naum Levin
(74) *Attorney, Agent, or Firm* — David B Kelley; Brooks Kushman P.C.

(57) ABSTRACT

A hands-free charging system includes a power source and a charging unit electrically connected to the power source. The charging unit includes an energy-storage device and a robotic coupler connectable to a charge port of a vehicle. The charging unit is configured to charge the vehicle with the power source, and the energy-storage device is configured to independently power the robotic coupler irrespective of an energization state of the power source. A controller is programmed to, in response to the power source becoming de-energized during a vehicle charging session, retract the robotic coupler from the charge port using power from the energy-storage device.

14 Claims, 4 Drawing Sheets

(51) Int. Cl.
  *B60L 53/53*    (2019.01)
  *B60L 53/55*    (2019.01)
  *H02J 7/02*     (2016.01)
  *B60L 53/60*    (2019.01)
  *H01M 10/44*    (2006.01)
  *H02J 7/34*     (2006.01)

(56) References Cited

U.S. PATENT DOCUMENTS

| | | | | |
|---|---|---|---|---|
| 5,461,298 | A * | 10/1995 | Lara | H01M 10/44 320/109 |
| 6,157,162 | A * | 12/2000 | Hayashi | H02J 7/0013 320/104 |
| 8,033,349 | B2 * | 10/2011 | Ortmann | B60L 53/16 180/65.1 |
| 8,853,999 | B2 * | 10/2014 | Haddad | B60L 53/35 320/109 |
| 9,056,555 | B1 * | 6/2015 | Zhou | B60L 53/35 |
| 9,169,114 | B2 * | 10/2015 | Butler, Jr. | G07F 13/025 |
| 9,327,607 | B2 * | 5/2016 | Oh | B60L 53/65 |
| 9,738,125 | B1 * | 8/2017 | Brickley | B60D 1/26 |
| 9,766,122 | B2 * | 9/2017 | Cothuru | B64C 19/00 |
| 9,815,377 | B2 * | 11/2017 | Wu | B60L 53/16 |
| 9,827,862 | B2 * | 11/2017 | Hwang | B60L 53/305 |
| 9,862,280 | B2 * | 1/2018 | McNally | B60L 53/18 |
| 9,873,347 | B2 * | 1/2018 | Brown | B60L 53/36 |
| 10,052,962 | B2 * | 8/2018 | Dunger | H02J 7/0027 |
| 10,093,189 | B2 * | 10/2018 | Sommarstrom | B25J 9/009 |
| 10,207,592 | B1 * | 2/2019 | Warden | B60L 10/10 |
| 10,286,793 | B2 * | 5/2019 | Paryani | B60L 53/16 |
| 10,427,304 | B2 * | 10/2019 | Leary | B25J 9/023 |
| 10,427,530 | B2 * | 10/2019 | Ricci | B60L 53/14 |
| 10,661,669 | B1 * | 5/2020 | Torok | B60L 53/36 |
| 10,685,455 | B2 * | 6/2020 | Sinha | G06K 9/6202 |
| 10,744,881 | B2 * | 8/2020 | Gamsjager | B60L 5/28 |
| 10,875,415 | B2 * | 12/2020 | Itoh | B60L 53/66 |
| 2010/0065344 | A1 * | 3/2010 | Collings, III | B60L 3/10 180/2.1 |
| 2010/0201309 | A1 * | 8/2010 | Meek | B60L 53/14 320/108 |
| 2011/0254504 | A1 * | 10/2011 | Haddad | B60L 53/65 320/109 |
| 2011/0316474 | A1 * | 12/2011 | Kimura | H02J 7/0042 320/107 |
| 2012/0185379 | A1 * | 7/2012 | Tu | B60L 53/65 705/39 |
| 2012/0233062 | A1 * | 9/2012 | Cornish | B60L 53/65 705/39 |
| 2012/0306443 | A1 * | 12/2012 | Smith | H02J 7/0042 320/109 |
| 2013/0076902 | A1 * | 3/2013 | Gao | H01R 13/6683 348/148 |
| 2013/0338820 | A1 * | 12/2013 | Corbett | B60L 53/35 700/232 |
| 2014/0067660 | A1 * | 3/2014 | Cornish | G06Q 20/145 705/39 |
| 2015/0210174 | A1 * | 7/2015 | Settele | B60L 53/37 320/109 |
| 2015/0314695 | A1 * | 11/2015 | McGrath | B60L 53/68 320/109 |
| 2016/0339791 | A1 * | 11/2016 | Sim | H02J 50/90 |
| 2016/0352113 | A1 * | 12/2016 | Zhao | B60L 53/35 |
| 2017/0136892 | A1 * | 5/2017 | Ricci | B60L 53/66 |
| 2017/0225578 | A1 * | 8/2017 | Paryani | B60L 53/11 |
| 2017/0267114 | A1 * | 9/2017 | Bianco | H02J 7/0013 |
| 2017/0349055 | A1 * | 12/2017 | Kilic | H01R 13/6315 |
| 2018/0001777 | A1 | 1/2018 | Kilic | |
| 2018/0222337 | A1 * | 8/2018 | Cook | B60L 53/65 |
| 2019/0105989 | A1 * | 4/2019 | Pachler | B60L 5/24 |
| 2019/0275907 | A1 * | 9/2019 | Lee | B60L 53/57 |
| 2019/0308509 | A1 | 10/2019 | Herman et al. | |
| 2020/0189413 | A1 * | 6/2020 | Fagan | H01R 13/631 |
| 2020/0207233 | A1 * | 7/2020 | Sato | B60L 58/26 |
| 2020/0353826 | A1 * | 11/2020 | Yaldo | B60L 53/16 |
| 2020/0361329 | A1 * | 11/2020 | Schutz | B60L 53/53 |
| 2020/0361331 | A1 * | 11/2020 | Shin | B60L 53/37 |
| 2021/0001736 | A1 * | 1/2021 | Schoob | B60L 53/37 |
| 2021/0094431 | A1 * | 4/2021 | Yang | B60L 53/65 |
| 2021/0114476 | A1 * | 4/2021 | Spaninks | B60L 53/18 |
| 2021/0126478 | A1 * | 4/2021 | Park | B60L 53/305 |
| 2021/0162874 | A1 * | 6/2021 | Lee | H02J 7/0045 |

FOREIGN PATENT DOCUMENTS

| | | | | |
|---|---|---|---|---|
| CN | 204452083 U | * | 7/2015 | |
| CN | 107000605 A | | 8/2017 | |
| DE | 102014215668 A1 | * | 2/2016 | ............. B60L 53/18 |
| JP | 3952637 B2 | * | 8/2007 | |
| JP | 2009272455 A | * | 11/2009 | |
| WO | WO-2013015926 A1 | * | 1/2013 | .......... H01M 10/613 |
| WO | WO-2013041133 A1 | * | 3/2013 | ............. B60L 53/16 |
| WO | WO-2018226583 A1 | * | 12/2018 | ............. B60L 53/31 |
| WO | WO-2019075151 A1 | * | 4/2019 | ............. B60L 53/16 |
| WO | WO-2019113143 A1 | * | 6/2019 | .......... B65H 75/364 |

\* cited by examiner

HANDS FREE CHARGING SYSTEM WITH POWER LOSS DETECTION AND MANAGEMENT

TECHNICAL FIELD

This disclosure relates to charging systems for electrified vehicles and more specifically to hands-free charging systems configured to automatically decouple with the vehicle during power loss.

BACKGROUND

A plug-in vehicle may enable an operator to connect the vehicle to an external power source. The operator, for example, may manually connect and disconnect a charging cable to the vehicle for charging purposes. This arrangement may allow the operator to charge a battery of the vehicle at a number of geographic locations.

SUMMARY

According to an embodiment, a hands-free charging system includes a power source and a charging unit electrically connected to the power source. The charging unit includes an energy-storage device and a robotic coupler connectable to a charge port of a vehicle. The charging unit is configured to charge the vehicle with the power source, and the energy-storage device is configured to independently power the robotic coupler irrespective of an energization state of the power source. A controller is programmed to, in response to the power source becoming de-energized during a vehicle charging session, retract the robotic coupler from the charge port using power from the energy-storage device.

According to another embodiment, a hands-free charging system includes a power source and a robotic coupler having a connector configured to couple with a vehicle charge port. The connector has one or more high-voltage terminals configured to deliver power from the power source to the vehicle charge port. An energy-storage device is configured to power the robotic coupler independent of the power source. A controller is programmed to, in response the one or more high-voltage terminals becoming de-energized during a vehicle charging session, retract the robotic coupler using power from the energy-storage device to decouple the connector from the charge port, and, in response the one or more high-voltage terminals becoming re-energized, extend the robotic coupler to recouple the connector with the charge port to resume charging.

According to yet another embodiment, a method of decoupling a hands-free charging system from a vehicle charge port during a power outage includes monitoring a voltage sensor associated with a high-voltage terminal of a connector of the hands-free charging system; in response to the voltage sensor indicating a loss of power during a charging session, retracting the connector from the vehicle charge port using an energy-storage device housed within the hands-free charging system; and, in response to the voltage sensor indicating a resumption of power, recoupling the connector to the vehicle charge port to continue the charging session.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

Figure 1:
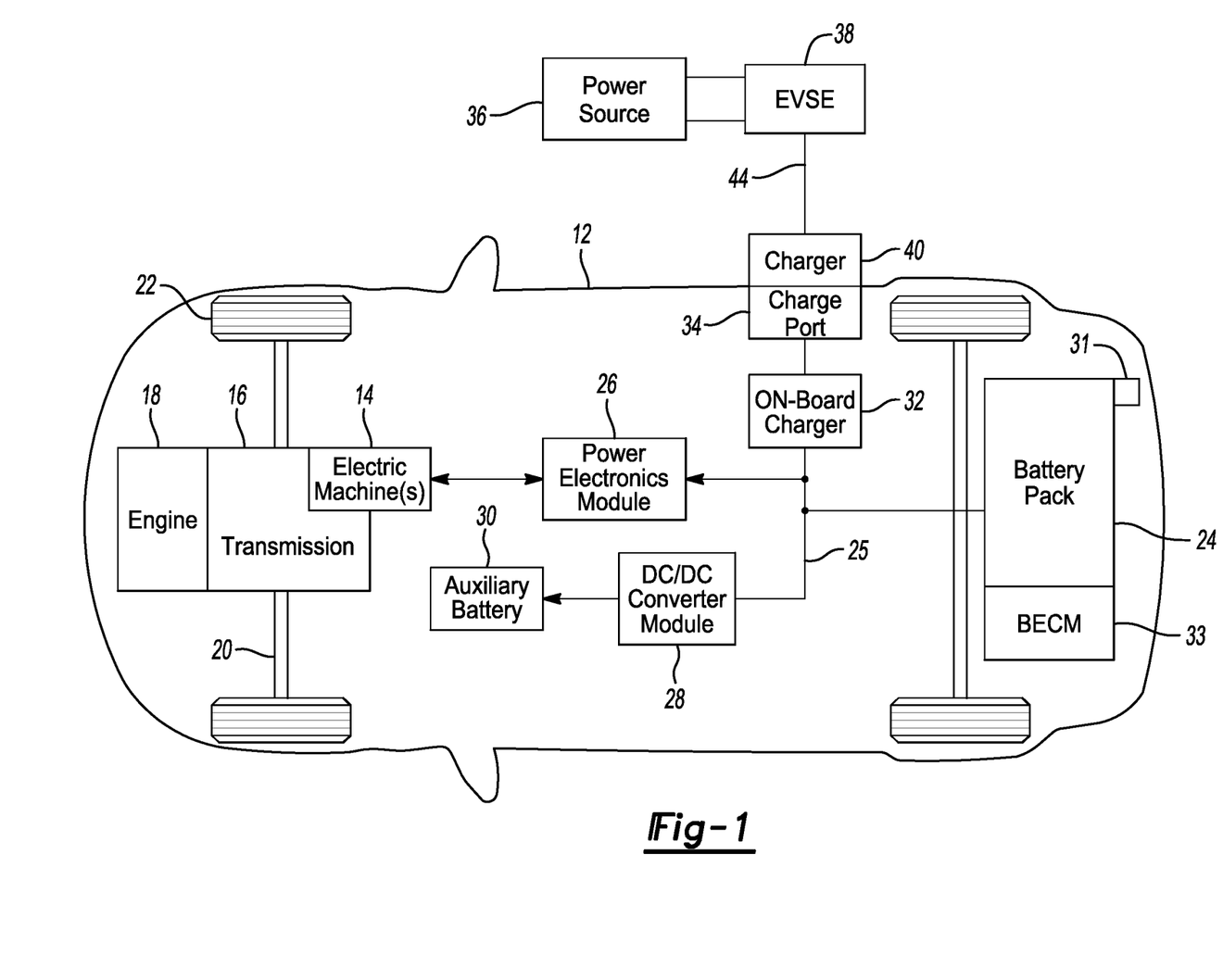
FIG. 1 is a schematic diagram of a plug-in hybrid vehicle and a hands-free charging system.

FIG. 1 depicts a schematic of a plug-in hybrid-electric vehicle (PHEV). Certain embodiments, however, may also be implemented within the context fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and slowing capability when the engine 18 is turned ON or OFF. The electric machines 14 also act as generators and can provide fuel economy benefits by recovering energy through regenerative braking. The electric machines 14 reduce pollutant emissions and increase fuel economy by reducing the workload of the engine 18.

A traction battery or battery pack 24 stores energy that can be used by the electric machines 14. The traction battery 24 typically provides a high-voltage (HV) direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal-management system. Examples of thermal-management systems include air cooling systems, liquid cooling systems, and a combination of air and liquid systems.

The traction battery 24 may be electrically connected to one or more power electronics modules 26 through one or more contactors. The one or more contactors isolate the traction battery 24 from other components when opened and connect the traction battery 24 to other components when closed. A power electronics module 26 is also electrically connected to the electric machines 14 and a high-voltage bus 25 and provides the ability to bi-directionally transfer energy between the traction battery 24 and the electric machines 14. For example, a typical traction battery 24 may provide a direct current (DC) voltage while the electric machines 14 may use a three-phase alternating current (AC) to function. The power electronics module 26 may convert the DC voltage to a three-phase AC current used by the electric machines 14. In a regenerative mode, the power electronics module 26 may convert the three-phase AC current from the electric machines 14 acting as generators to the DC voltage used by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high-voltage DC output of the traction battery 24 to a low-voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12-volt battery). In other embodiments, the battery 30 may be 24 or 48 volts.

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a hands-free charging system that includes electric vehicle supply equipment (EVSE) 38 (also known as a charging station, a wall unit, and the like) connected to an external power source 36. The external power source 36 may be an electrical power distribution network or grid as provided by an electric utility company. As shown, the external power source may be electrically coupled to the EVSE 38. The EVSE 38 is capable of providing DC and/or AC electric power to the vehicle. The EVSE 38 may be installed as a wall-mounted unit in a garage, alongside a building where vehicles typically park, or as a stand-alone unit.

The EVSE 38 may receive and transfer the received electrical power through a cord 44 to a charging unit 40, which may also be referred to as a ground unit. The term "ground unit" does not required it to be on the ground/floor and in some embodiments, may be mounted on a wall, a charge-station housing, or other surface. The charging unit 40 is a hands-free and includes a robotic coupler configured to autonomously plug a connector of the charging unit 40 into a mating charge port 34 on the electric vehicle 12. The charge port 34 may be a dedicated port for the robotic coupler, e.g., the vehicle includes a second charge port for a manual connection, or charge port 34 may be a single, shared port. As one example, the external power may be AC power received at the charge port 34 that is converted to DC power by an on-board charger 32 located within the electric vehicle 12. The on-board charger 32 may then operate to charge the traction battery 24. Alternatively, the on-board charger 32 may be located in the EVSE 38 or the charging unit 40 external to the electric vehicle 10. In some embodiments, the EVSE 38 and the charging unit 40 may be packaged in a same housing.

The charging unit 40 and charge port 34 may utilize a conductive connection in which the electrical conductors (pins) in one connector make physical contact with the electrical conductors (pins) in the other connector. However, it is also contemplated that a wireless power transfer (WPT) system may be employed where a transmitter may provide electric power to a receiver without the use of physical electrical conductors (e.g., power may be transferred through free space). It is contemplated that the power output into a wireless field (e.g., magnetic induction, electric induction, etc.) may be received, captured by, or coupled by a "receiving coil" to achieve the power transfer.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, reference to "a controller" refers to one or more controllers. The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller within each of the subsystems identified above. Representative examples of parameters, systems, and/or components that may be directly or indirectly actuated using control logic executed by the controller. Used herein, "high voltage" refers to a voltage exceeding 42 V AC or 60 V DC. "Low voltage" refers to voltages that are not high.

Figure 2:
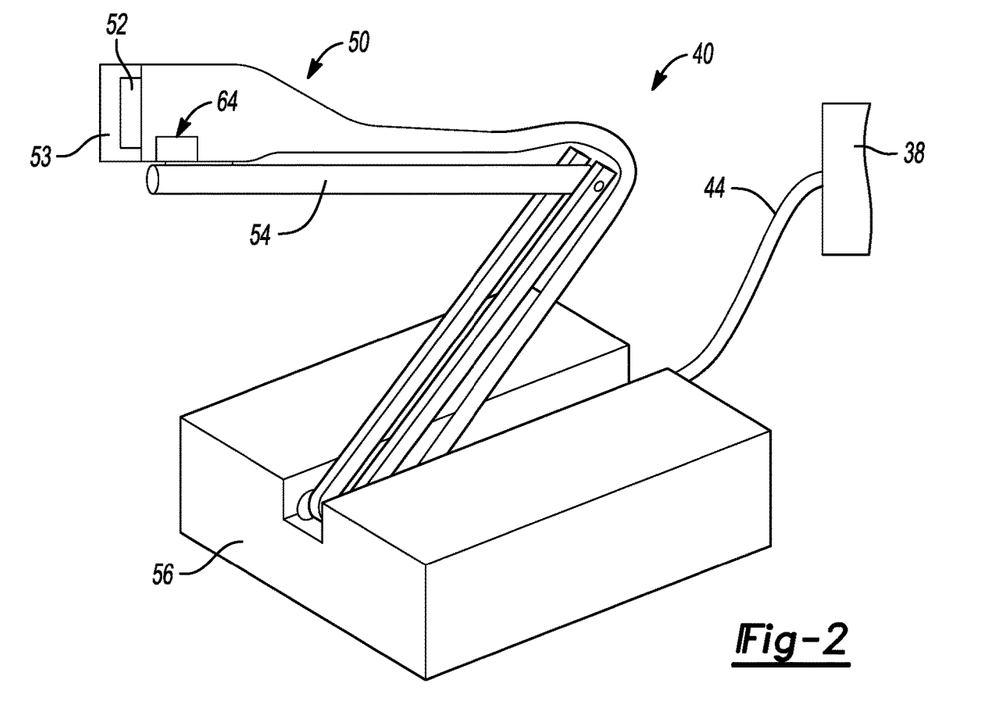
FIG. 2 is a perspective view of a robotic charging unit of a hands-free charging system according to an embodiment of the present disclosure.

Referring to FIG. 2, the charging unit 40 includes a robotic coupler 50 configured to autonomously plug a connector 52 into the vehicle charge port. The coupler 50 may include a robotic arm 54 that is mounted to a base 56 at one end and supports the connector 52 at the other end. The robotic arm 54 may be formed of one or more articulating segments driven by one or more actuators. The actuators may include electric motors, gearing, linkages, and the like. The robotic coupler 50 may be configured to move left and right, forward and back, up and down, and adjust yaw and pitch providing freedom of movement so that the connector 52 can be plugged into the vehicle charge port for a range of different vehicle positions.

The base 56 may be a stationary base (as shown) or may be movable. In a movable embodiment, for example, the base 56 may be supported on wheels, tracks, or the like allowing the charging unit 40 to be driven to the vehicle charge port. The base 56 is electrically connected to the EVSE 38 by the cable 44.

The robotic coupler 50 may include a cover 53 for the terminals of the connector 52. The cover 53 is movable between a closed position (shown) and an open position. When in the closed position, the terminals are protected from dirt and other debris and are isolated to prevent inadvertent contact with other objects. When the cover is in the open position, the terminals are exposed and can be inserted into mating terminals of the charge port 34. The cover 53 may be disposed over an end of the connector and is pivotal between the open and closed positions. Alternatively, the cover 53 may have one or more spring-loaded panels.

Figure 3:
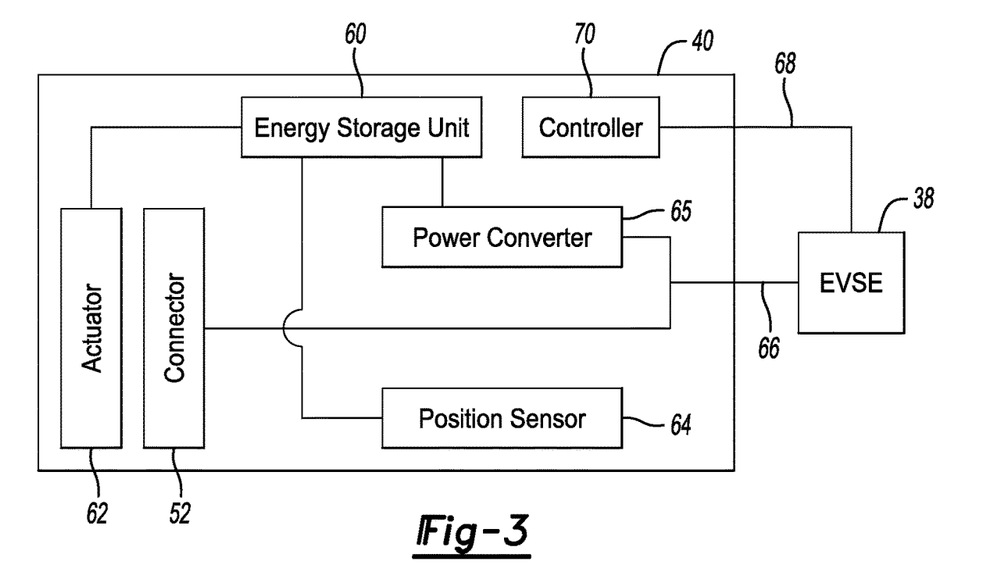
FIG. 3 is a schematic diagram of a hands-free charging system for a vehicle.

Referring to FIG. 3, some codes and regulations require that the connector 52 remain de-energized prior to connection with the vehicle. This creates a problem since the charging unit 40 requires power to communicate with the vehicle and to move the actuator(s) of the robotic system to plug the connector 52 into the vehicle charge port. Additionally, the robotic coupler should be disconnectable during a power outage. To solve this and other problems, the charging unit 40 includes an energy-storage device 60 configured to power actuators 62, a position sensor(s) 64, and/or other components associated with autonomously moving the robotic coupler 50 when the charging unit 40 is electrically disconnected from the high-voltage power supply 66 of the EVSE 38 due to power loss or by design. The high-voltage supply wires 66 may be within the cord 44. The energy-storage device 60 may be a battery or a capacitor. The energy-storage device 60 may be 12 or 24 volts, for example, and may have a storage capacity of one amp-hour for example. The energy-storage device 60 has an associated power converter 65 that conditions the high-voltage power 66 received from the EVSE 38 to a voltage and/or current compatible with the energy-storage device 60. The power converter 65 may be a step-down or step-up converter or transformer. The power converter 65 may also include an rectifier that converts received AC power into a DC power if the energy-storage device 60 is a battery or a capacitor.

In the charging unit 40, the one or more actuators 62 associated with the robotic coupler 50 are powered by the energy-storage device 60 and/or wall power (not shown). In the illustrated embodiment, the energy-storage device 60 is the sole power source for the actuator 62, but in other embodiments, the actuator may operate on wall power, such as via power supply 66. Power the actuator 62, at least in part, with the energy-storage device 60 allows the robotic coupler 50 to be operated when the high-voltage power source 66 (or other power source) is electronically disconnected from the charging unit 40. The position sensor 64 may be powered by the energy-storage device 60, may be powered by a low-voltage power supply 68 (optional) of EVSE 38 through a controller 70, or both.

The position sensor 64 may be configured to provide a signal to the controller 70, indicative of a position of a vehicle charge port 34 relative to the connector 52. The position sensor 64 may be located on or near the connector 52 as shown in FIG. 2. The position sensor 64 may be configured to monitor or detect the position of a position feature disposed on or proximate the vehicle charge port 34. The position feature may be an emitter configured to provide or emit a magnetic field, infrared waves, optical waves, or a radio frequency configured to be detected or received by the position sensor 64. The position sensor 64 may be provided with a magnetic field sensor, an infrared receiver, photodetector array, or radio receiver configured to receive the magnetic field, infrared waves, optical waves, audio, ultrasonic, or radio frequency emitted by the position feature.

Figure 4:
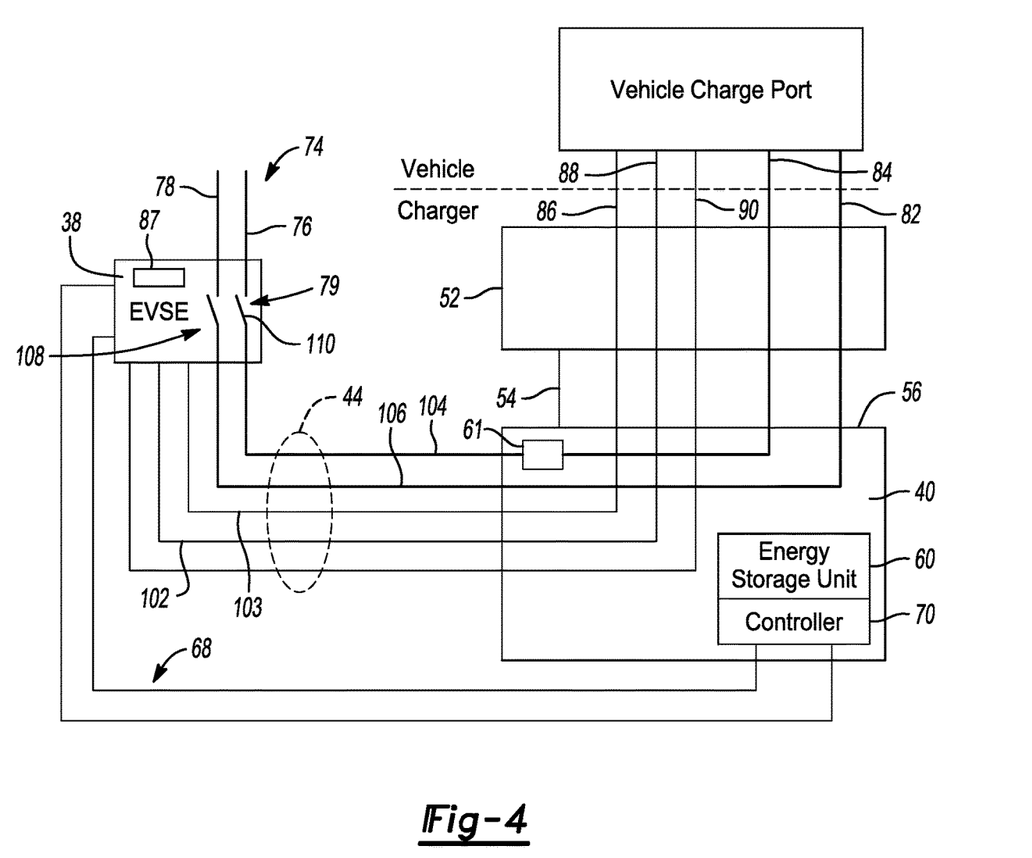
FIG. 4 is a schematic diagram of the hands-free charging system of FIG. 3 connected to a vehicle charge port.

FIG. 4 illustrates a schematic diagram of the charging unit 40 connected to the vehicle charge port 34. The EVSE 38 is connected to the power source 36 by high-voltage wires 74 that may include a line 76 and a line/neutral 78. These wires may be connected to terminals 79 within the EVSE 38. Used herein, "high voltage" refers to greater than or equal to 50 volts DC and 60 volts AC. Common voltages for the wires 74/76 includes 120 V and 240 V.

The connector 52 and the charge port 34 of the vehicle may be according to one or more standards such as SAE J1772. In one embodiment, the connector 52 may include five pins: two HV AC pins 82, 84, a proximity detection pin 86, a control pilot pin 88, and a ground pin 90. The pins may be male or female pins. The charge port 34 may include five matching pins: two HV AC pins, a proximity detection pin, a control pilot pin, and a ground pin. The pins may be male or female pins. For example, the connector 52 may include female pins and the port 34 may include male pins. In some embodiments, the connector and the port may include two additional pins for DC charging. Of course, SAE J1772 is just one example configuration and others are contemplated.

In one or more embodiments, a control pilot circuit 102 is used to control the charging process between the EVSE 38 and the on-board charger 32 among other functions and a proximity circuit 103 is used to determine a connection between the connector 52 and the vehicle charge port 34. The control pilot circuit 102 may include an oscillator configured to generate a plus-minus 12-volt pulse width modulation (PWM) signal (referred to as a control pilot signal) at 1 kilohertz (kHz) duty cycle for example. During operation, the duty cycle may vary. This PWM signal is commutated to the vehicle charger 32 over the cord/port and is detected by a vehicle controller. The control pilot signal passes through a resistor, e.g., a 1.0 kiloohm (kΩ) resistor, prior to the vehicle 12. In the charger 32, the circuit 102 includes a diode and a pair of parallel resistors. A first resistor may have a resistance of 2.74 kΩ and a second resistor resistance of 1.3 kΩ. The first resistor may be hardwired to ground, whereas the second resistor is connected to ground through a switch. The switch may be biased open and commanded closed in response to sensing of the control pilot signal. When the connector 52 is connected to the charge port 34, the control pilot signal voltage at the connector 52 may be defined by the voltage divider formed by the resistances of resistors relative to the ground. The resulting voltage may indicate to the vehicle controller and the EVSE controller 87 that the connector 52 is correctly connected to the charge port 34. Closing the switch connects the second resistor to ground and induces a voltage change detected by the EVSE 38.

The EVSE 38 is configured close a switching arrangement 108 in response to detecting the voltage change allowing power to flow from the EVSE 38 to the vehicle charge port 34 though the HV lines 104 and 106. The switching arrangement 108 may include relays, contactors, switches, or any other device capable of electrically connecting and disconnecting the terminals 79 to the high-voltage lines 104 and 106. In the illustrated embodiment, a pair of contactors 110 are used. The contactors 110 are controlled by the controller 87 as will described in detail below. The controller 87 is configured to modify the charging voltage and current based on the signals of the control pilot circuit 102. Further details of a control pilot circuit, a proximity circuit, and charging protocols are described in Applicant's Pat. No. 10,046,661 (issued Aug. 14, 2018), the contents of which are incorporated in their entirety by reference herein.

The charging unit 40 may include a sensor 61 configured to measure current, voltage, or the like to determine if the connector 52 has power. The sensor 61 is in communication with one or more of the controllers 70, 87. The sensor 61 is configured to output data indicative of a sensed value to the one or more controllers. The controllers are configured to interpret that data to determine the sensed value, and compare that sensed value to threshold to determine if sufficient powers present at the connector 52 to charge the vehicle. Using the sensor 61, the controller can determine if there is a complete power loss, partial power loss, sometimes referred to as a brownout, or other abnormality. While shown within the base 56, the sensor 61 may be located in any location suitable for detecting electrical power in the high-voltage line(s), the terminals, or at the EVSE.

The controller 70 and 87 operate in conjunction with the vehicle controller to operate the hands-free charging system and charge the vehicle. In some embodiments, these pair of controllers may be replaced with a single controller. While illustrated as separate controllers 70, 78, these controllers are in communication with each other and may generally be referred to as a controller herein and in the claims. Therefore, any reference to "a controller" refers to one or more controllers. Each controller may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controllers communicate with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by a controller within each of the subsystems identified above.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
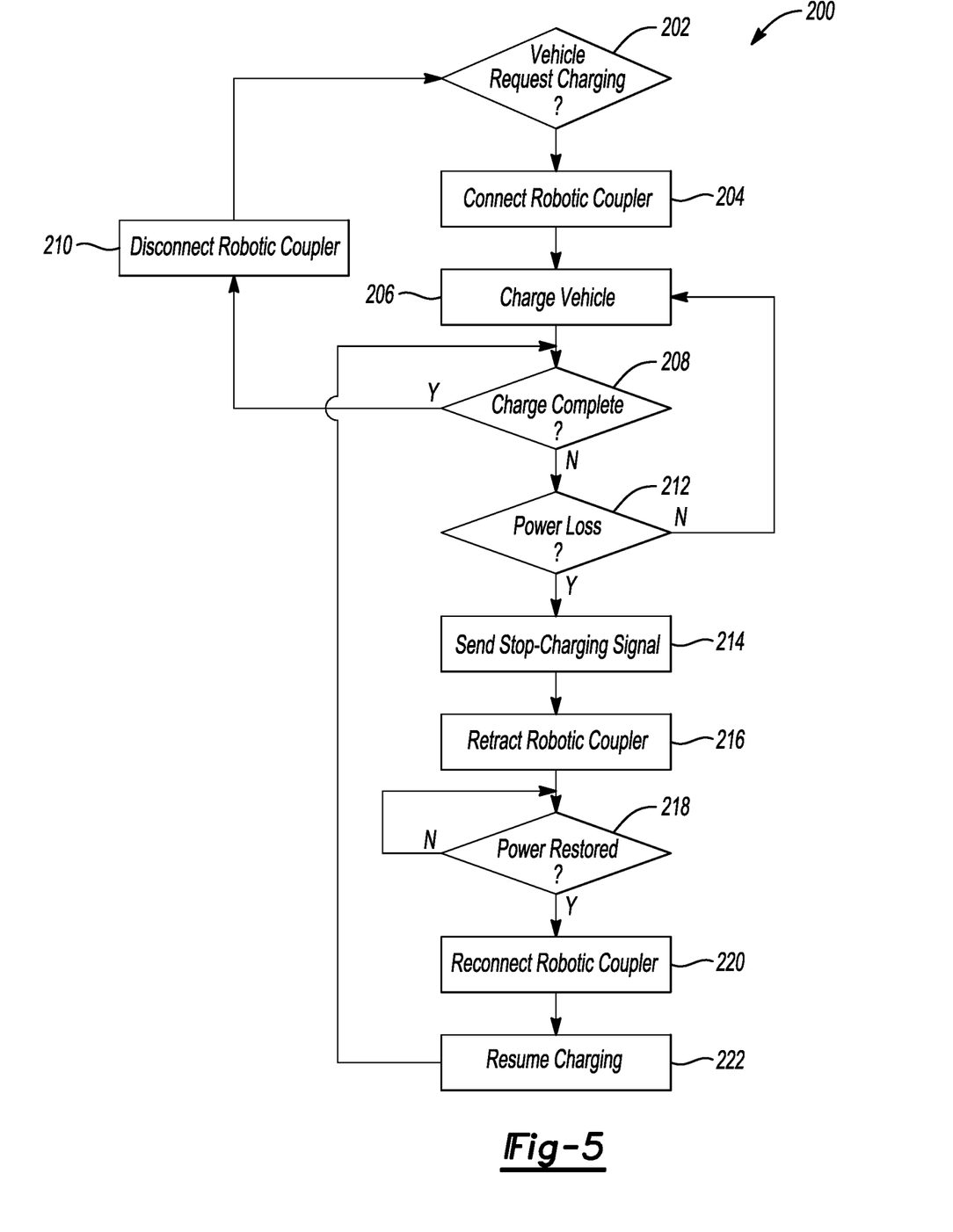
FIG. 5 is a flowchart of an algorithm for operating the hands-free charging system during a power outage.

FIG. 5 is a flowchart 200 of an algorithm for controlling the hands-free charging system. For ease of description, the flowchart 200 will be described in conjunction with the above-described illustrated embodiment. It is to be understood, however, that the flowchart of 200 is equally applicable to other embodiments. At operation 202, the controller determines if a vehicle charge request has been received. If yes, control passes to operation 204, and the robotic coupler 50 is connected to the vehicle. In some embodiments, the robotic coupler 50 may be actuated while the terminals of the connector 52 are deenergized due to the switching arrangement 108 being open. As such, robotic coupler 50 is powered solely by the energy-storage device 60. This keeps the terminals of connector de-energized until connected to the vehicle. In alternative embodiments, the actuator of the robotic coupler is powered by wall power. Once the connector is inserted into the vehicle charge port, the control pilot circuit 102 and the proximity circuit 103 become operational and the switching arrangement 108 is closed once these signals are validated. Closing the switching arrangement 108 electrically connects the high-voltage pins 82 and 84 to the high-voltage lines 76 and 78 energizing the connector 52 to charge the vehicle at operation 206. At operation 208, the controller determines if the vehicle traction battery is completely charged. If yes, the switching arrangement 108 is opened to end charging. Once the switching arrangement 108 is opened and the connector 52 is deenergized. The robotic coupler 50 is then disconnect from the vehicle at operation 210 using either the energy-storage device or wall power.

If no at operation 208, control passes to operation 212, and the controller determines if a power loss has occurred during the charging session. The power loss may be due to loss of power at the power grid, e.g., the EVSE is no longer receiving power, or may be due to a loss of power between the EVSE the and the robotic coupler due to an open circuit, a short circuit or other failure mode. If the power loss is detected at operation 212, the controller may send a stop-charging signal to the vehicle at operation 214. This operation is optional and may only be sent for specific types of power losses, such as a partial power outage or a loss of connection between the EVSE the and the robotic coupler. The controller may command opening of the switching arrangement 108 in response to a power loss being detected at operation 212. The power loss may be detected by monitoring sensor associated with the high-voltage terminals of the connector. The sensor may be a current sensor, a voltage sensor, or any other sensor capable of detecting a loss of power. The sensor is in electric communication with the controller is configured to output a signal indicative of a sensed value, such as voltage in the high-voltage wires. The controller is programmed to, for example, compare the sensed value with a threshold, and if the sensed value is less than the threshold, determine that the power has been lost.

At operation 216, the controller commands the robotic coupler to retract and disconnect from the vehicle. The energy-storage device 60 is used to retract the robotic coupler 50 since wall power may be unavailable due to a power outage or a loss of connection between the EVSE and the charging unit 40. In some embodiments, wall power may be used to disconnect the robotic coupler at operation 216 if available. At operation 218, the controller determines of power has been restored during an active charging session, i.e., the charging is still requested. The controller might determine the energization state based on readings from the sensor discussed above in operation 212. For example, if the sensed voltage in the high-voltage lines exceeds a threshold, the controller may declare power restored. If yes at operation 218, control passes to operation 220 and the controller commands the robotic coupler to reconnect the vehicle charge port. Once the robotic coupler is reconnected, charging is resumed at operation 222.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hands-free charging system comprising:
   a power source;
   a charging unit electrically connected to the power source and including an energy-storage device and a robotic coupler connectable to a charge port of a vehicle, wherein the charging unit is configured to charge the vehicle with the power source, and the energy-storage device is configured to independently power the robotic coupler irrespective of an energization state of the power source; and
   a controller programmed to:
      in response to the power source becoming de-energized during a vehicle charging session, retract the robotic coupler from the charge port using power from the energy-storage device, and
      in response to the power source becoming re-energized following the robotic coupler being retracted, recouple the robotic coupler to the charge port and resume the vehicle charging session.

2. The hands-free charging system of claim 1, wherein the robotic coupler is recoupled to the charge port using power from the energy-storage device.

3. The hands-free charging system of claim 1, wherein the robotic coupler includes a connector and an actuator configured to autonomously move the connector into engagement with the charge port.

4. The hands-free charging system of claim 3, wherein the energy storage device is configured to power the actuator.

5. The hands-free charging system of claim 1, wherein the controller is further programmed to, in response to the power source becoming de-energized during a vehicle charging session, open the switching arrangement.

6. The hands-free charging system of claim 1, wherein the energy-storage device is a battery or a capacitor.

7. The hands-free charging system of claim 1, wherein the power source is a power grid.

8. A hands-free charging system comprising:
   a power source;
   a charging unit electrically connected to the power source and including an energy-storage device and a robotic coupler connectable to a charge port of a vehicle, wherein the charging unit is configured to charge the vehicle with the power source, and the energy-storage device is configured to independently power the robotic coupler irrespective of an energization state of the power source;
   an electric vehicle supply equipment (EVSE) connected to the charging unit by a cable, the EVSE including a switching arrangement configured to electrically connect the charging unit to the power source when closed and to electrically disconnect the charging unit from the power source when open; and a controller programmed to:
- in response to the power source becoming de-energized during a vehicle charging session, open the switching arrangement and retract the robotic coupler from the charge port using power from the energy-storage device, and
- in response to the power source becoming re-energized following the robotic coupler being retracted, couple the robotic coupler to the charge port using power from the energy-storage device and subsequently close the switching arrangement.

9. A hands-free charging system comprising:

a power source;

a robotic coupler including a connector configured to couple with a vehicle charge port, the connector including one or more high-voltage terminals configured deliver power from the power source to the vehicle charge port;

an energy-storage device configured to power the robotic coupler independent of the power source;

an electric vehicle supply equipment (EVSE) electrically connected to the connector, the EVSE including a switching arrangement configured to electrically connect the one or more high-voltage terminals to the power source when closed and to electrically disconnect the one or more high-voltage terminals from the power source when open;

a controller programmed to:
- in response to the one or more high-voltage terminals becoming de-energized during a vehicle charging session, opening the switching arrangement and subsequently retract the robotic coupler using power from the energy-storage device to decouple the connector from the charge port, and
- in response to the power source becoming re-energized following the robotic coupler being retracted and a charging session being active, couple the robotic coupler to the charge port using power from the energy-storage device and subsequently close the switching arrangement to resume charging.

10. The hands-free charging system of claim 9, wherein the robotic coupler is extended using power from the energy-storage device.

11. The hands-free charging system of claim 9, wherein the robotic coupler further includes an actuator electrically connected to the energy-storage device.

12. The hands-free charging system of claim 9 further comprising one or more voltage sensors associated with the one or more high-voltage terminals, wherein the controller is programmed to determine an energization state of the one or more high-voltage terminals based on readings of the one or more voltage sensors.

13. The hands-free charging system of claim 9, wherein the energy-storage device is a battery.

14. The hands-free charging system of claim 9, wherein the energy-storage device is a capacitor.

* * * * *